United States Patent [19]

Gellert

[11] Patent Number: 4,875,848
[45] Date of Patent: Oct. 24, 1989

[54] INJECTION MOLDING HEATED GATE INSERT AND METHOD

[76] Inventor: Jobst U. Gellert, 7A Prince Street, Georgetown, Canada, L7G 2X1

[21] Appl. No.: 162,296

[22] Filed: Feb. 29, 1988

[51] Int. Cl.⁴ .................. B29C 45/20; B29C 45/72
[52] U.S. Cl. ..................................... 425/549; 425/568
[58] Field of Search .................... 425/549, 566, 568

[56] References Cited

U.S. PATENT DOCUMENTS

| | | | |
|---|---|---|---|
| Re. 30,335 | 7/1980 | Johansson | 425/549 |
| 3,468,482 | 9/1969 | Lindner et al. | 425/549 |
| 3,797,984 | 3/1974 | Yago et al. | 425/549 |
| 4,010,903 | 3/1977 | Sakuri et al. | 425/549 |
| 4,279,588 | 7/1981 | Gellert | 425/568 |
| 4,286,941 | 9/1981 | Gellert | 425/566 |
| 4,309,163 | 1/1982 | Cottancin | 425/549 |
| 4,345,892 | 8/1982 | Schulte et al. | 425/568 |
| 4,389,002 | 6/1983 | Devellian et al. | 425/549 |
| 4,478,780 | 10/1984 | Kim | 425/549 |
| 4,643,664 | 2/1987 | Yoshida | 425/549 |
| 4,652,230 | 3/1987 | Osuna-Diaz | 425/549 |
| 4,663,811 | 5/1987 | Gellert | 425/568 |
| 4,743,795 | 12/1988 | Schmidt et al. | 264/328.15 |

*Primary Examiner*—Willard Hoag
*Attorney, Agent, or Firm*—Riches, McKenzie & Herbert

[57] ABSTRACT

This invention relates to a gate insert which screws into the forward end of an injection molding nozzle and a method of making it. The gate insert has an intermediate portion which extends between a threaded cylindrical rear portion which screws into the nozzle and a cylindrical nose portion which is secured in an opening in the cavity plate and forms the gate. A gradually tapered melt bore extends axially through the gate insert, and an electrical heating element is integrally embedded in the gate insert with a helical portion extending around the melt bore to maintain the temperature of the melt as it flows through the bore. The gate insert is made by forming a body portion with a neck portion having a tapered outer surface extending between the rear portion and the nose portion. A recess is machined in the tapered surface and a helical portion of the heating element is wound in the channel. A nut portion having a matching tapered inner surface is mounted on the neck portion. A slug of nickel alloy is placed in a filler tube which leads to a filler bore extending radially through the nut portion. The assembly is heated in a vacuum furnace to integrally cast the heating element in the channel and bond the nut portion to the body portion.

6 Claims, 5 Drawing Sheets

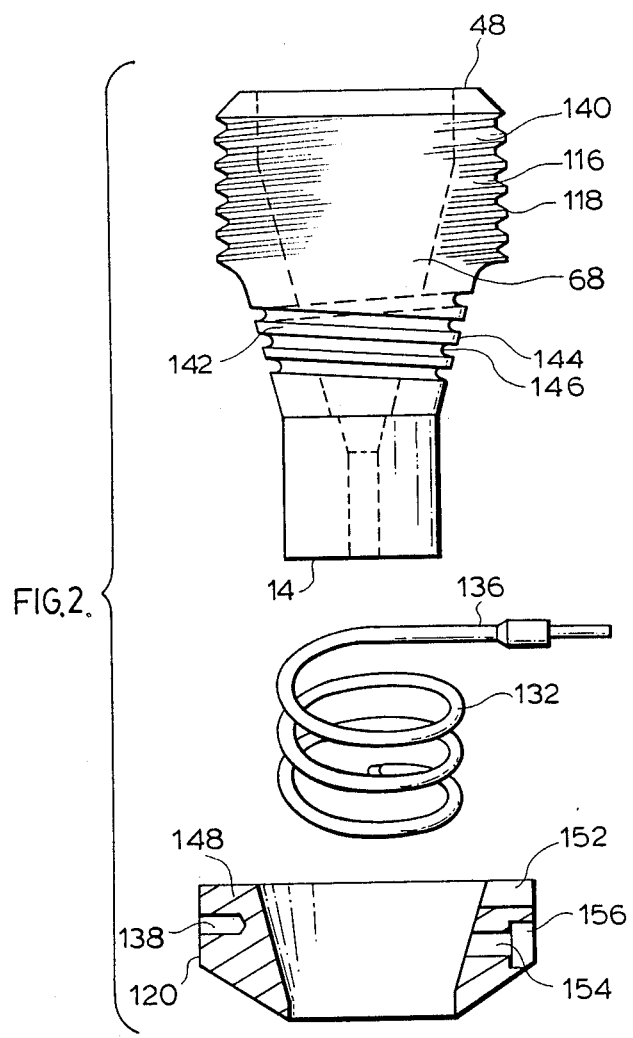

INJECTION MOLDING HEATED GATE INSERT AND METHOD

BACKGROUND OF THE INVENTION

This invention relates generally to injection molding nozzles and more particularly to a nozzle with an improved removable gate insert member.

Injection molding nozzles having a removable gate insert are known in the art. The applicant's U.S. Pat. No. 4,286,941 entitled "Injection Molding Nozzle Seal" which issued Sept. 1, 1981 shows an early example of a nozzle seal with one end seated in the forward end of a nozzle and the other end extending into an opening in the cavity plate to the cavity. More recently, the applicant's Canadian patent applications Ser. No. 532,677 filed March 20, 1987 entitled "Injection Molding Nozzle and Method" and 549,516 filed October 16, 1987 entitled "Injection Molding System having Clamped Rotatable Nozzles and Method" show a removable tip or gate insert member. While these previous gate inserts do increase heat flow to the gate area, this has been found to still not be sufficient for some materials such as crystaline materials having a narrow temperature window.

It is also known to provide increased heat in the gate area using a probe with a heated tip which the melt flows around such as shown in U.S. Pat. No. 4,643,664 to Yoshida which issued Feb. 17, 1987. A nozzle having a heated pointed tip is shown in the applicant's Canadian patent application Ser. No. 49,518 filed Oct. 16, 1987 entitled "Injection Molding Nozzle having Grounded Heating Element Brazed into Pointed Tip" However, none of the prior art shows a removable gate insert which the melt flows through and which provides sufficient heat for these temperature critical applications.

SUMMARY OF THE INVENTION

Accordingly, it is an object of the present disadvantages of the prior art by providing a gate insert member with an integral internal electric heating element and a method of making it.

To this end, in one of its aspects, the invention provides an elongated injection molding nozzle with a forward end, a rear end and a gate insert member removably seated in the forward end of the nozzle, the nozzle having a melt channel extending to a central mouth at the forward end of the nozzle and an integral electrical heating, the gate insert member comprising a cylindrical rear portion extending to a rear end of the gate insert member shaped for removable insertion into the forward end of the nozzle a nose portion extending to a forward end of the gate insert member, and an intermediate portion extending between the rear portion and the nose portion, a central melt bore extending axially through the gate insert member from an inlet at the rear end to an outlet at the forward end, and an electrical heating element having a helical portion and a terminal portion, the terminal portion extending to connect to a lead from an external power source, the helical portion being integrally embedded in the gate insert member to extend around the melt bore through the gate insert member.

Further objects and advantages of the invention will appear from the following description, taken together with the accompanying drawings.

BRIEF DESCRIPTION OF THE DRAWINGS

FIG. 2 is an exploded view of the components of the gate insert seen in FIG. 1.

DETAILED DESCRIPTION OF THE DRAWINGS

Figure 1:
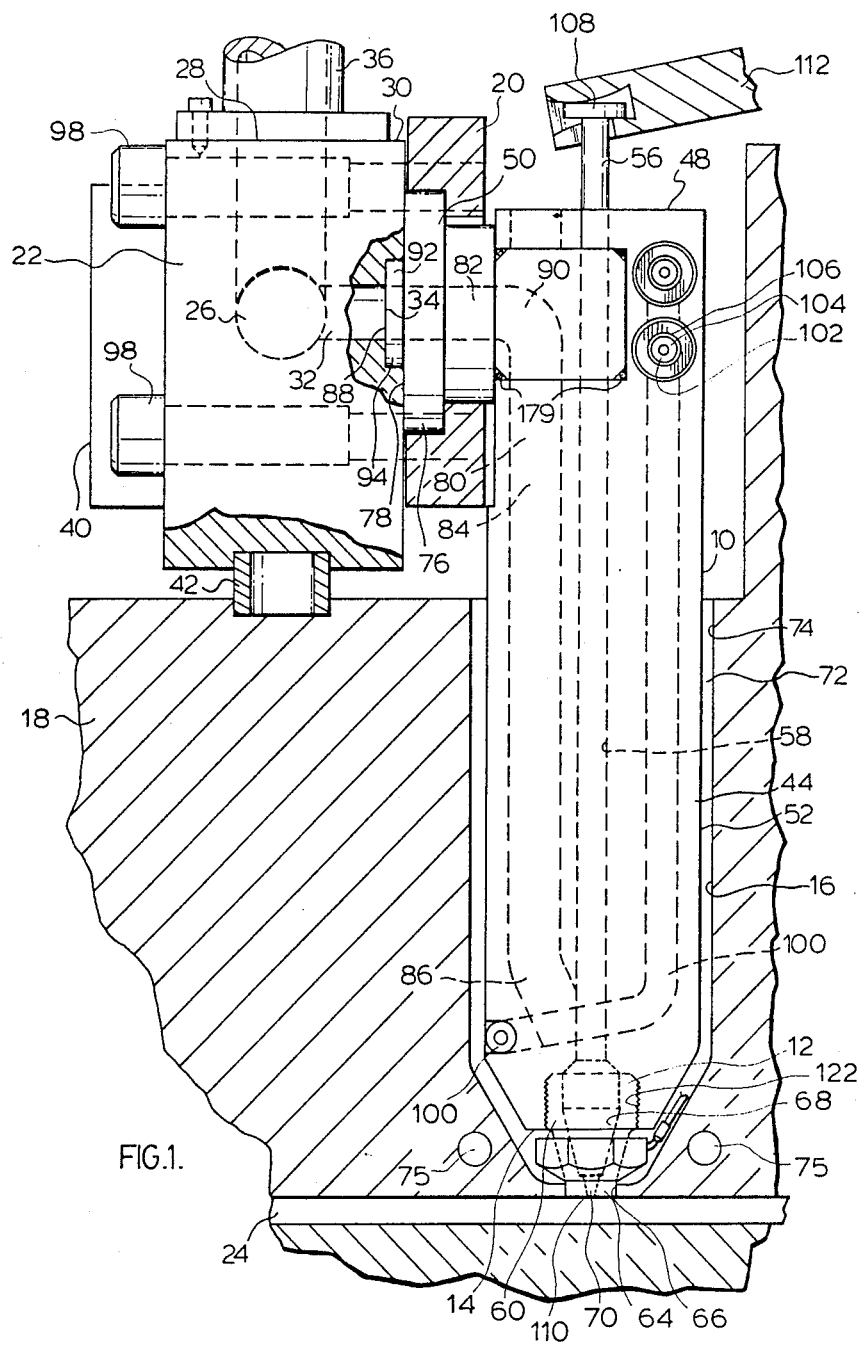
FIG. 1 is a sectional view of a portion of typical injection molding system showing a nozzle and a gate insert according to one embodiment of the invention.
Figure 5:
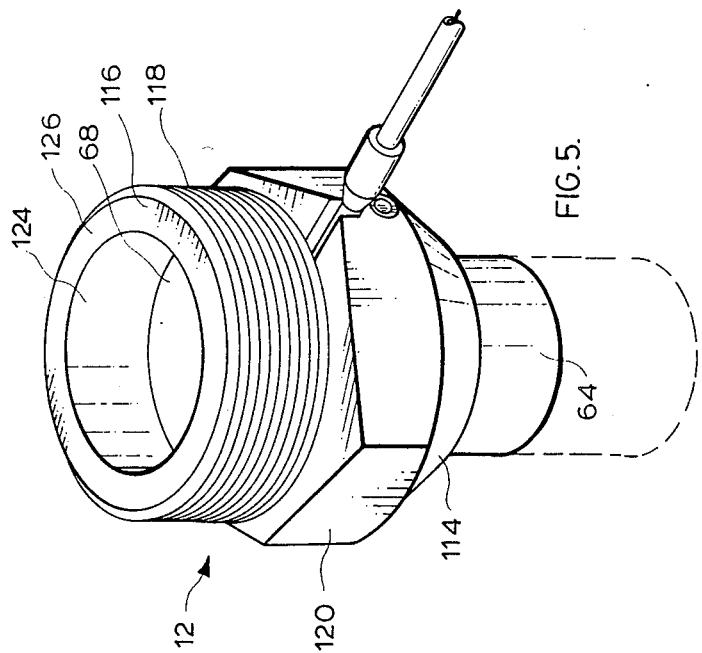
FIG. 5 is an isometric view of a completed gate insert and FIG. 6 is a sectional view showing a gate insert made according to another embodiment of the invention.

Reference is first made to FIG. 1 which shows a portion of an injection molding system having a heated nozzle 10 with a gate insert or gate insert member 12 according to one embodiment of the invention seated in its forward end 14. While a multi-cavity valve gated system is shown, it will be apparent that the gate insert according to the invention can also be used with a single cavity and/or spruce gated system. In the configuration, the nozzles 10 are each seated in a well 16 in a core or cavity plate 18. The nozzles 10 are secured in different orientations by clamping members 20 to an elongated manifold 22 to convey melt from the manifold 22 to a cavity 24. The manifold 22 has a longitudinal melt bore 26 which connects an inlet 28 on the rear surface 30 to a number of outlet bores 32 which branch to spaced outlets 34. A heated melt conveying tube 36 is bolted to the rear surface 30 of the manifold 22 to convey pressurized melt from a molding machine (not shown). The manifold 22 is heated by an electric plate heater 40 bolted to the manifold 22 and is located relative to the core 20 by a locating ring 42 seated between them. Each nozzle 10 has a main body 44 with a forward end 14 and a rear end 48 and an integral side portion 50 which projects sidewards adjacent the rear end 48 of the main body 44. The nozzle 10 has a generally cylindrical outer surface 52, although in the system shown it has a pair of opposed flat sides. An elongated valve pin 56 extends through a central valve pin bore 58. The valve pin bore 58 has an enlarged mouth 60 at the forward end 46 which is threaded to securely receive the hollow gate insert 12 according to the invention. As described in more detail below, the steel gate insert 12 has a cylindrical nose portion 64 which is received in an opening 66 through the core 18 and a tapered central bore 68 which is in alignment with the valve pin bore 58. The bore 68 forms a gate 70 leading to the cavity 24 and the nose portion 64 accurately locates the nozzle in the well 16. An insulative air space 72 is provided between the heated nozzle 10 and the inner wall 74 of the well 18 in the surrounding core 18 which is cooled by water flowing through cooling conduits 75.

In the system shown, the side portion 50 of each nozzle 10 has an outwardly projecting flanged portion 76 which extends circumferentially around a central face 78. The nozzle 10 has a melt channel 80 with a lateral portion 82 and a longitudinal portion 84. As can be seen, the longitudinal portion 84 extends parallel to, but offset from the central valve pin bore 58 until a diagonal portion 86 extends to connect it to the central bore 68 of the gate insert 12 seated in the mouth 60 of the valve pin bore 58 adjacent the forward end 14. The lateral portion 82 of the melt channel 80 extends from an inlet 88 on the central face 78 of the side portion 50 and connects to the longitudinal portion 84 at a smoothly curved bend 90. The manifold 22 has a recessed cylindrical seat 92 extending around each outlet 34 from the melt bore 26. The side portion 50 of each nozzle 10 has a collar 94 which projects outwardly around the melt channel inlet 88 on the central face 78. The inlets 88 are equal in diameter to the outlets 34, and when the collar 94 of a particular nozzle 10 is received in the recessed seat 92, the respective inlet 88 and outlet 34 are maintained in accurate alignment even if there is some rotational movement between them. The pair of flanged clamping members 20 are releaseably secured by bolts 98 to the side surface of the manifold 22. When the nozzle 10 is mounted with the collar 94 received in the recessed seat 92, the clamping members 20 engage the flanged portion 76. As each nozzle 10 is installed individually, the bolts 98 are tightened sufficiently to hold it in place, but not to prevent it rotating. After all of the nozzles are mounted with their respective orientations, the bolts 98 are all tightened to secure the collar 94 of each nozzle 10 against the recessed seat 92 in the side surface of the manifold to prevent leakage of the melt during use. However, it will be appreciated that this structure will still permit slight rotational movement between each nozzle 10 and the manifold 22 due to thermal expansion, while still retaining the inlet 88 and outlet 34 in accurate alignment.

Each nozzle 10 has an integral 220 volt single wire heating element 100 with a coiled chrome-nickel resistance wire 102 extending through a refactory powder electrical insulating material 104 such as magnesium oxide inside a steel casing 106. As mentioned above, in the system shown, an elongated valve pin 56 is located in the central valve pin bore 58 of each nozzle 10. Each valve pin has a driven end 108 and a tapered tip end 110. The driven end 108 is engaged by a rocker arm 112 which is driven by a hydraulically actuated piston (not shown). Hydraulic fluid applied to the piston according to a predetermined cycle reciprocates the valve pin 56 in the valve pin bore 58 between a forward closed position in which the tip end 110 is seated in the gate 70 and a retracted open position.

Referring now to FIGS. 2-5, the gate insert 12 according to this embodiment of the invention has an intermediate portion 114 extending between a cylindrical rear portion 116 and the nose portion 64. As can be seen, the rear portion 116 has a threaded outer surface 118 and the intermediate portion 114 has a hexagonal outer surface 120 which can be engaged by a wrench to tighten the gate insert 12 in the mouth 60 which has matching threads 122. The central bore 68 gradually reduces in diameter as it extends axially through the gate insert 12 from an inlet 124 at the rear end 126 to an outlet 128 at the forward end 130. As can be seen in FIG. 1, the gate insert 12 is mounted in place wherein the forward end 130 is flush with the cavity 24 during use. The gate insert 12 has an electrical heating element 132 with a helical portion 134 which is integrally embedded in the gate insert 12 and a terminal portion 136 which extends to be connected to a lead from an external power source (not shown). In one embodiment shown, the heating element 132 is a 24 volt d.c. element with a resistance wire (not shown) which extends through an insulating material in a steel casing and is grounded to the gate insert 12 at an end remote from the terminal 136. A thermocouple hole 138 is provided in the intermediate portion 114 to receive a thermocouple to measure the temperature adjacent the helical portion 134 of the heating element 132.

In use, after the system has been assembled as described and shown, electrical power is applied to the heating elements 100 and 132 in the nozzle 10 and the gate insert 12 to heat them to a predetermined operating temperature. Pressurized melt is then introduced into the manifold melt bore 26 by the molding machine (not shown). Melt pressure is controlled according to a predetermined cycle in conjunction with the application of controlled hydraulic pressure to the actuating mechanism, in a conventional manner. With each valve pin 56 in the retracted open position, the pressurized melt flows through the melt channel 80 in the nozzle and the central bore 68 of the gate insert 12 and fills the cavity 24. After the cavity is full, injection pressure is held momentarily to pack and hydraulic pressure is then applied to drive the valve pins 56 to the forward closed position with the tip end 110 of each valve pin 56 seated in one of the gates 70. The injection pressure is then released and this position is held for a short cooling period before the mold is opened for ejection. After ejection, the mold is closed and hydraulic pressure reapplied to draw the valve pin 56 to the retracted open position. Melt injection pressure is reapplied to refill the cavity, and the molding cycle is repeated continously in a uniform cycle, depending on the size and shape of the cavity and the type of material being molded.

Reference is made to FIGS. 2-5 in describing the steps involved in the manufacture of gate inserts 12 according to this embodiment of the invention. As shown in FIG. 2, a body portion 140 is made of steel with a rear end 48 and a forward end 14. The body portion 140 has a neck portion 142 with a tapered outer surface 144 extending between a cylindrical rear portion 116 with a threaded outer surface 118 which extends to the rear end 48 and a smaller diameter cylindrical nose portion 64 which extends to the forward end 14. A central bore 68 which gradually reduces in diameter between the rear end 48 and the forward end 14 is machined in the body portion 140. A spiral channel 146 is machined in the tapered outer surface 144 of the neck portion 116 to receive the heating element 132 therein.

Figure 3:
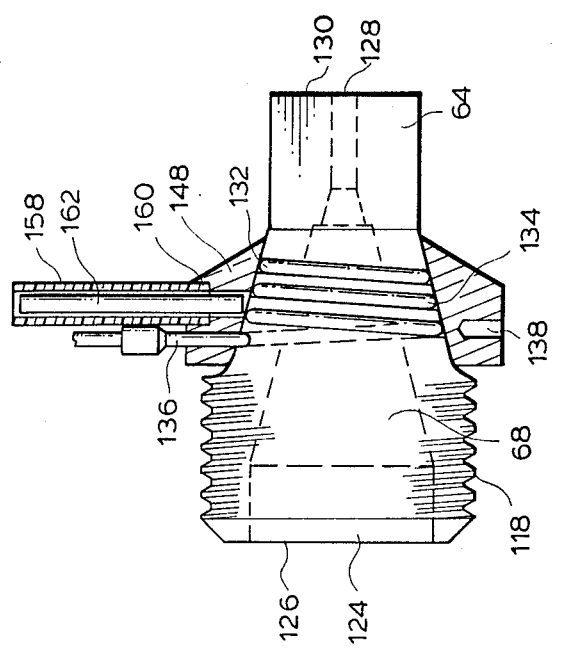
FIG. 3 is a sectional view showing the components assembled.
Figure 4:
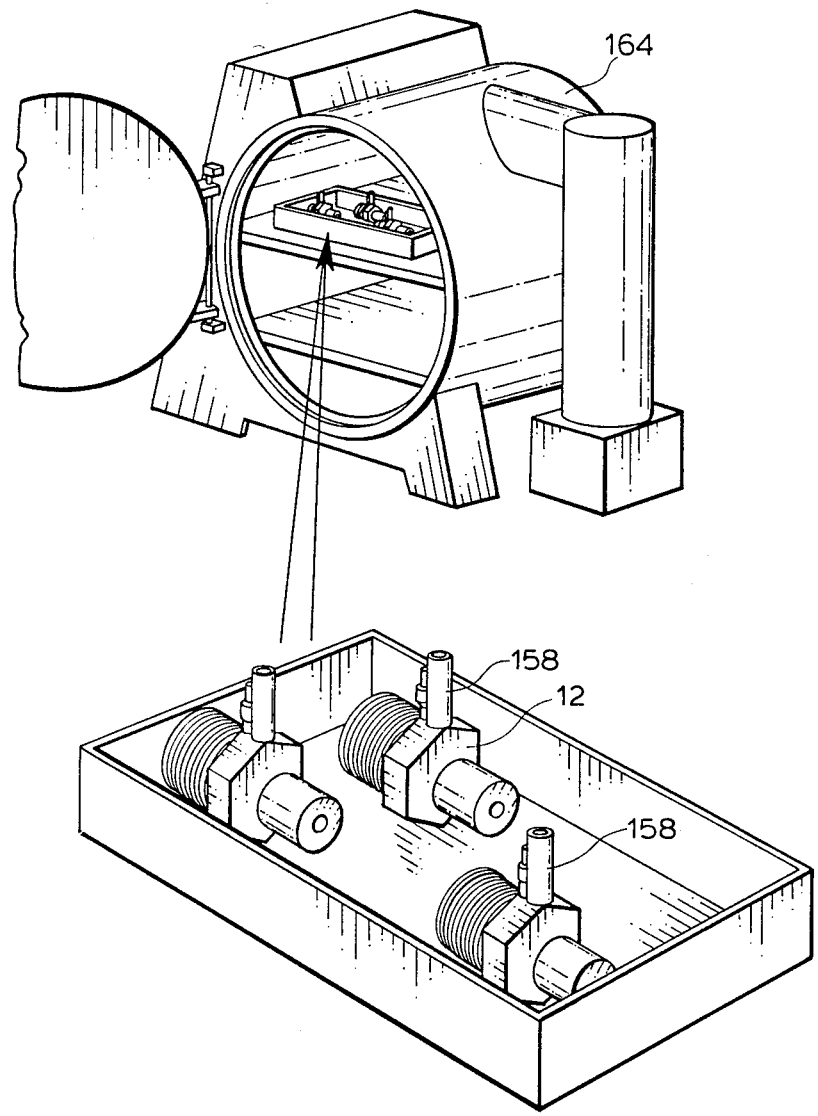
FIG. 4 shows a batch of assembled units ready to go into the vacuum furnace.

A nut portion 148 having a hexagonal outer surface 120 is made of steel with a tapered inner surface 150 which matches the tapered outer surface 144 of the neck portion 116. A U-shaped radially extending opening 152 is machined in the nut portion 148 to receive the terminal portion 136 of the heating element 132 therethrough. A filler bore or opening 154 having an enlarged mouth 156 is drilled radially through the nut portion 148, and a thermocouple hole 138 is drilled radially inwardly partially through the nut portion 148. The heating element 132 is then wound in the spiral channel 146 to form the helical portion 134 with the terminal portion 136 extending outwardly from the channel 146. The nut portion 148 is then mounted on the neck portion 142 of the body portion 140 and tack welded in position with the tapered inner surface 150 of the nut portion 148 abutting against the tapered outer surface 144 of the neck portion 142. As can be seen in FIG. 3, the nut portion 148 covers the helical portion 134 of the heating element 132 wound in the spiral channel 146 and the terminal portion 136 extends radially out through the U-shaped opening 152. A filler tube or reservoir 158 is then mounted with its bottom end 160 seated in the mouth 156 of the filler bore 154. A slug 162 containing a predetermined quantity of nickel alloy is inserted into the filler tube 158 and the assembly is heated in batches to a temperature of about 2,150° F. in a vacuum furnace 164 as depicted in FIG. 4. When the nickel alloy melts, it flows under the influence of the vacuum in the vacuum furnace into the space in the spiral channel 146 around the helical portion 134 of the heating element and between the tapered inner and outer surfaces 150,144. This forms an integral metalergical bond between the steel of the heating element casing 106, the neck portion 142 and the nut portion 148 which facilitates heat transfer and avoids the formation of hot spots along the heating element. After removal from the vacuum furnace, the gate insert is machined to remove the filler tube 158.

Figure 6:
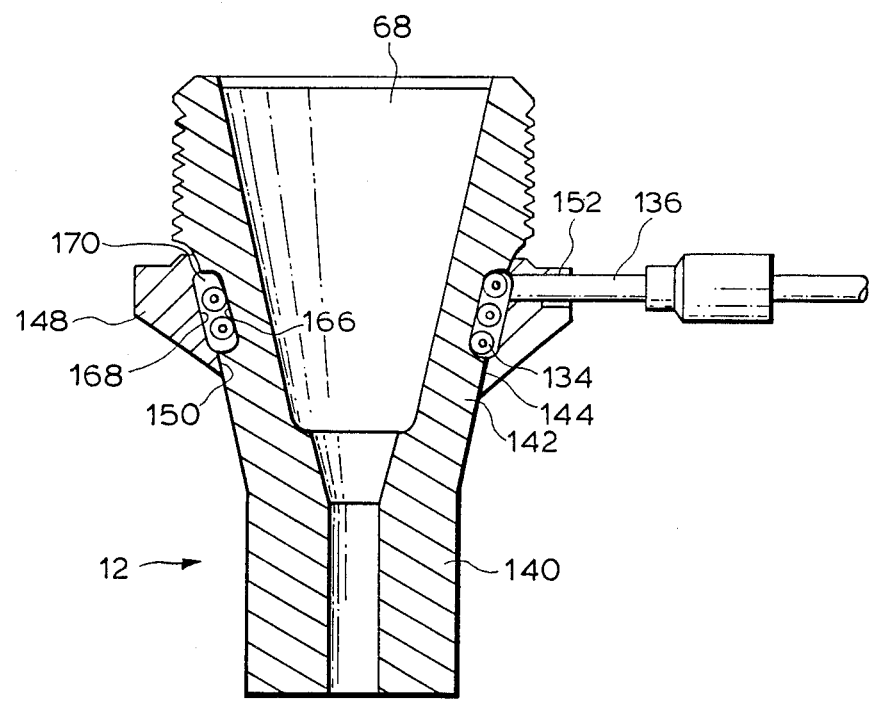

Reference is now made to FIG. 6 which shows a gate insert 12 according to another embodiment of the invention. Most of the elements of this embodiment are identical to the elements of the first embodiment, so elements common to both embodiments are described and illustrated using the same reference numerals. In this embodiment the body portion 140 is also made with a neck portion 142 with a tapered outer surface 144 which receives the tapered inner surface 150 of the nut portion 148. However, in this embodiment a circumferential recess 166 is machined in the outer surface 144 and a second matching recess 168 is machined in the inner surface 150 of the nut portion 48. The helical portion 134 of the heating element 132 is then wound in the recess 166 in the outer surface 144 and the nut portion 148 is then mounted on the neck portion 142 of the body portion 140. As can be seen, the two matching recesses 166, 168 form a circumferential chamber 170 which contains the helical portion 134 of the heating element, and the terminal portion 136 extends radially out through opening 152. The method of making and use of this embodiment are otherwise the same as that described above and the description need not be repeated. It will be apparent that when the nickel alloy flows in from the filler tube 158 when it is heated in the vacuum furnace, it fills the chamber 170 around the helical portion 134 of the heating element. As described above, it forms an integral metalergical bond between the heating element casing 106 and the surrounding neck portion 142 and nut portion 148.

While the description of the gate insert 12 and method of making it have been given with respect to preferred embodiments, they are not to be construed in a limiting sense variations and modifications will occur to those skilled in the art. The gate insert can have other configurations, for example with the nose portion tapered. When the nut portion 148 is mounted on the neck portion 142 of the body portion, the joints between them can be sealed with a suitable paste to avoid the leakage of nickel alloy during the vacuum casting step. Reference is made to the appended claims for a definition of the invention.

What I claim is:

1. An elongated injection molding nozzle with a forward end, a rear end and gate insert member removably seated in the forward end of the nozzle, the nozzle having a melt channel extending to a central mouth at the forward end of the nozzle and an integral electrical heating, the gate insert member comprising:
   (a) a cylindrical rear portion extending to a rear end of the gate insert member shaped for removable insertion into the forward end of the nozzle a nose portion extending to a forward end of the gate insert member, and an intermediate portion extending between the rear portion and the nose portion,
   (b) a central melt bore extending axially through the gate insert member from an inlet at the rear end to an outlet at the forward end, and
   (c) an electrical heating element having a helical portion and a terminal portion, the terminal portion extending to connect to a lead from an external power source, the helical portion being integrally embedded in the gate insert member to extend around the melt bore through the gate insert member.

2. An injection molding nozzle as claimed in claim 1 wherein the rear portion of the gate insert member has a threaded outer surface.

3. An injection molding nozzle as claimed in claim 2 wherein the intermediate portion of the gate insert member has a nut-like engageable outer surface.

4. An injection molding nozzle as claimed in claim 3 wherein the intermediate portion of the gate insert member has a thermocouple hole extending radially inward from the outer surface to a position adjacent the helical portion of the heating element.

5. An injection molding nozzle as claimed in claim 3 wherein the central melt bore gradually reduces in diameter between the inlet and the outlet.

6. An injection molding nozzle as claimed in claim 5 wherein the nose portion is generally cylindrical.

* * * * *